(12) United States Patent
Atkins et al.

(10) Patent No.: US 6,724,501 B2
(45) Date of Patent: Apr. 20, 2004

(54) APPARATUS AND METHOD FOR DITHER MATRIX DESIGN FOR COLOR HALFTONING USING DISPERSED DOT CLUSTERS

(75) Inventors: Clayton B. Atkins, Mountain View, CA (US); Daniel R. Tretter, Palo Alto, CA (US); Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 188 days.

(21) Appl. No.: 09/885,946

(22) Filed: Jun. 22, 2001

(65) Prior Publication Data

US 2002/0196454 A1 Dec. 26, 2002

(51) Int. Cl.[7] .............................................. H04N 1/405
(52) U.S. Cl. ..................... 358/3.17; 358/3.13; 358/534; 358/535
(58) Field of Search ................. 358/1.9, 3.01, 358/3.06, 3.13, 3.16, 3.17, 3.18, 3.2, 534, 535, 536; 382/162, 237

(56) References Cited

U.S. PATENT DOCUMENTS 5,859,955 A * 1/1999 Wang ......................... 358/1.9

FOREIGN PATENT DOCUMENTS

| EP | 0593304 A2 | 4/1994 |
| EP | 0843462 A2 | 5/1998 |

OTHER PUBLICATIONS

C. Brian Atkins et al: "Halftone postprocessing for improved highlight rendition": Image Processing 1997 International Conference on Santa Barbara, Ca Oct. 26–29, 1997.

Theophano Mitsa, et al. "Digital Halftoning Technique Using A Blue–Noise Mask", J. Opt. Soc. Am. A/vol. 9, No. 11/Nov. 1992, p.p. 1920–1929.

Victor Ostromoukhov, et al., "Stochastic Clustered–Dot Dithering", Ecole Polytechnique Federale, Lausanne (EPFL), pp 1–10, Oct. 1999.

Daniel L. Lau, et al., "Digital Color Halftoning With Generalized Error Diffusion And Multichannel Green–Noise Masks", IEEE Transactions on image Processing, vol. 9, No. 5, May 2000, p.p. 923–935.

Robert Ulichney, et al., "The Void–And–Cluster Method For Dither Array Generation", Digital Equipment Corporation, Maynard, MA 01754–2571, SPIE vol. 1913, p.p. 332–343, Sep. 1993.

* cited by examiner

Primary Examiner—Thomas D Lee

(57) ABSTRACT

An apparatus and method for dither matrix design for color halftoning using dispersed dot clusters where the dot cluster centers are arranged in a homogeneous and isotropic pattern, in order avoid the moiré effect. The method requires that the size of the array and the number of dot seeds that will be in the array be predetermined.

24 Claims, 13 Drawing Sheets

| 12 | 11 | 10 | 9 | 8 |
|----|----|----|----|----|
| 13 | 22 | 21 | 20 | 7 |
| 14 | 23 | 24 | 19 | 6 |
| 15 | 16 | 17 | 18 | 5 |
| 0 | 1 | 2 | 3 | 4 |

APPARATUS AND METHOD FOR DITHER MATRIX DESIGN FOR COLOR HALFTONING USING DISPERSED DOT CLUSTERS

TECHNICAL FIELD

The technical field relates to an apparatus and a method for color halftoning, and in particular, a dither matrix design for color halftoning that uses dot clusters whose centers are distributed homogeneously and isotropically.

BACKGROUND

The purpose of digital halftoning is to render a continuous tone image using an output device with a limited pallet, or set of available colors. In practice there are two halftoning techniques, point processing and neighborhood processing. In point processing, pixels are halftoned in isolation of one another, meaning that the pixels need not be processed in any particular order, thus requiring less processing capacity and less memory. In neighborhood processing, each pixel is quantized based on the pixel itself in addition to neighboring pixels. As a result, pixels may have to be processed in a particular order, requiring greater computational capability and perhaps utilizing an excessive amount of memory. As the present application focuses on point processing techniques, point processing will be described in further detail.

In a majority of point processing techniques, halftoning is implemented by screening, which is implemented using dither matrices. In screening, an array of thresholds, which is tiled across the image, is required, the array having finite dimensions of height and width. Each pixel is quantized strictly based on a comparison between the pixel value and the corresponding threshold value. Therefore any halftoning process using the dither matrix relies heavily on the dither matrix itself since the dither matrix has such a heavy bearing on the appearance of the output image.

In the vast majority of the literature concerning halftoning using dither matrices, there are two types of screening or halftoning processes in use. The first is clustered dot halftoning, which is also known as amplitude modulation halftoning. In clustered dot halftoning, the halftone dither matrix encourages formation of dot clusters arranged on a rectangular lattice, which may be rotated. The darkness or lightness of an image is dependent on the size of the fixed dots in the image. Clustered dot halftoning is ideal for unstable printing devices, e.g. earlier generation laser printers. When printed in isolation, dots from such early generation laser printers may not develop predictably, and may appear diffuse, very soft, very hard to see, or sometimes not even there at all. However, when printed in groups, dot clusters are consistent in size and easy to see. As a result, clustered dot printing, which arranges dots so that they are clustered together, is more reliable for unstable laser printers.

There are two problems associated with clustered dot halftoning. First, the clustered dot halftoning technique can lead to the creation of moiré artifacts. The moiré effect is the interference pattern created by superimposing two or more regular patterns. The moiré effect typically comes about when a previously rendered image is recreated, i.e. when printing an image that was first printed, then scanned into a computer. The moiré effect occurs because the previously rendered image has already been sampled. The previously rendered image has a periodicity from the sampling rate of the prior printing. This periodicity is propagated to the current printing and the discrepancies between the two periodicities result in unsightly artifacts in the final rendering. The second problem associated with clustered dot halftoning is that the level of detail that can be rendered is reduced because of the clustered nature of the dots.

The second type of screening technique is dispersed dot halftoning. In dispersed dot halftoning, which is also known as frequency modulation (FM) halftoning, the darkness or lightness of a tone is dependent of the density of the dot distribution. For instance, darker tones are caused by having a higher density of dots in a particular area, but not by clustering the dots. Dispersed dot halftoning allows for finer detail rendition. By not clustering the smallest indivisible printed dots, dispersed dot halftoning maximizes the spatial resolution of printed images relative to the resolution of the printer. Furthermore, dispersed dot halftoning is more resistant to the moiré effect. Dispersed dot halftoning avoids the moiré effect because the process arranges dots in a random fashion. Dispersed dot halftoning avoids imparting periodicity to the rendered image and thereby avoid creating moiré effect artifacts.

One problem associated with dispersed dot halftoning is that the technique is not appropriate for unstable printers, e.g. earlier generation laser printers. The dispersed nature of the dot pattern means that if a dot in a particular location is not visibly printed, there are no nearby dots to compensate for the lack of a visible dot in that location.

What is needed is a design for matrices for color halftoning which is a cross between traditional clustered dot and dispersed dot screening and allows the formation of dot clusters whose centers are arranged homogeneously and isotropically, thus allowing for a smoother and more even appearing image and finer detail rendering while being resistant to the moiré effect and providing more reliable printing for unstable printers.

SUMMARY

A method for dither matrix design for color halftoning using dispersed dot clusters, comprises placing dot seeds in an array, arranging the dot seeds such that the resulting pattern is homogeneous and isotropic to minimize the results of the moiré effect, arranging labels on the dot seeds corresponding to the different colors to be printed such that each dot seed of a particular color is well dispersed from other dot seeds of the same color, growing dot clusters around the dot seeds of each color after having separated the seeds of each color into its own separate array, and finally outputting the results, a collection of screens corresponding to each of the colors, to a file. In one embodiment, three color labels are assigned. In a preferred embodiment, the three color labels are cyan, magenta, and yellow. In an alternative embodiment, four color labels are assigned. In an alternative preferred embodiment, the four color labels are cyan, magenta, yellow, and black. In a preferred embodiment, the method further comprises the step of placing additional dot seeds labeled with an additional color into spaces between the dot seeds that have been arranged with color labels. In one embodiment, the additional color is yellow.

An apparatus for implementing the method for dither matrix design for color halftoning using dispersed dot clusters, comprises a module for placing dot seeds in an array, a module for arranging the dot seeds such that the resulting pattern is homogeneous and isotropic to minimize the results of the moiré effect, a module for arranging labels on the dot seeds for the different colors to be printed such that each dot seed of a particular color is well dispersed from other dot seeds of the same color, a module for growing dot clusters around the dot seeds after having separated the seeds of each color into its own separate array, and a module for outputting the results, a collection of screens corresponding to each of the colors, to a file. In one embodiment, three color labels are assigned. In a preferred embodiment, the three color labels are cyan, magenta, and yellow. In an alternative embodiment, four color labels are assigned. In an alternative preferred embodiment, the four color labels are cyan, magenta, yellow, and black. In a preferred embodiment, the method further comprises the step of placing additional dot seeds labeled with an additional color into spaces between the dot seeds that have been arranged with color labels. In one embodiment, the additional color is yellow.

In a preferred embodiment, the size of the array as well as the number of dot seeds that will be in the array are predetermined. Also, in a preferred embodiment, dot clusters are grown around each dot seed in a spiral pattern.

As a result of the dispersed dot clusters method, each screen taken alone would substantially have the property that using the screen creates an image with dispersed clusters of printed dots. However, a set of screens configured using the dispersed dot clusters method would have the additional property that using them together would allow color images to consist of smoother textures, having less color fluctuation.

The apparatus and method for dither matrix design for color halftoning using dispersed dot clusters may be implemented on a machine, which comprises a memory containing the instructions for implementing the apparatus and method for dither matrix design for color halftoning using dispersed dot clusters, a processor for accessing the memory and implementing the instructions, and an output device controlled by the processor for displaying an output resulting from the execution of the instructions. In a preferred embodiment, the machine is a computer connected to a printer output device.

DESCRIPTION OF THE DRAWINGS

The detailed description will refer to the following figures wherein:

FIG. 12 is a diagram of a spiral pattern.

DETAILED DESCRIPTION

Figure 1:
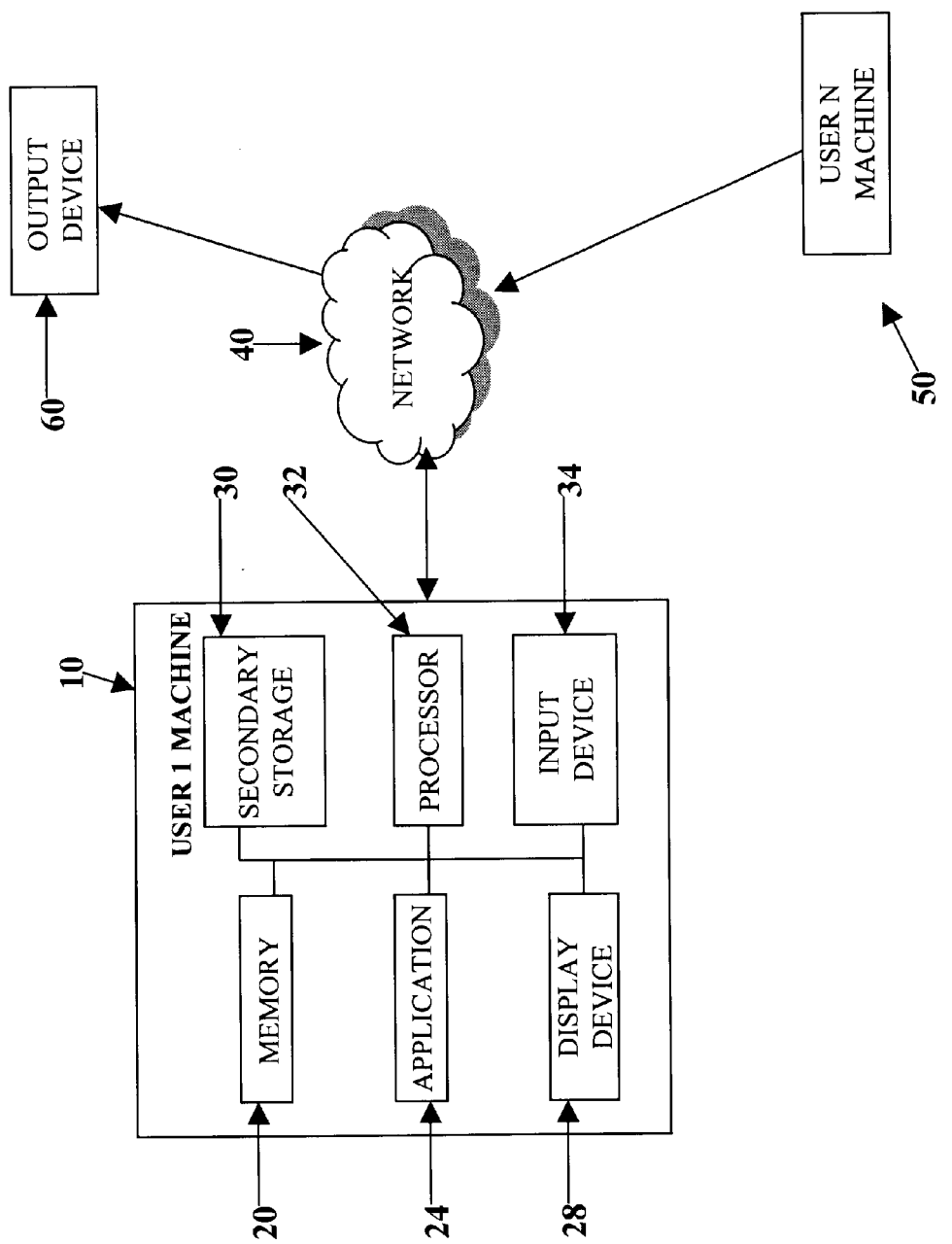
FIG. 1 is a block diagram of a preferred hardware system for implementing the method of dither matrix design for color halftoning using dispersed clustered dots.

FIG. 1 is a block diagram illustrating exemplary hardware components for implementing the method for dither matrix design for color halftoning using dispersed dot clusters. User machine 10 is connected with a network 40, such as the Internet or other network system, to allow for printing on an attached or unattached printer. Alternatively, output device 60 may be connected to user machine 10 directly rather than through a network 40. Other user machines, such as user machine 50 may also be connected with network 40 for printing. User machine 50, and other user machines, may include the same components as user machine 10.

User machine 10 illustrates typical components of a user machine. User machine 10 typically includes a memory 20, a secondary storage device 30, a processor 32, an input device 34, a display device 28, and an output device 60. In the present application, output device 60 is ideally a printer but may include any type of device for presenting an output image. Output device 60 may also include other types of output devices, such as speakers or any device for providing information in audio form.

Memory 20 may include random access memory (RAM) or similar types of memory, and it may store one or more applications 24 for execution by processor 32. Secondary storage device 30 may include a hard disk drive, floppy disk drive, CD-ROM drive, or other types of non-volatile data storage. Processor 32 may execute applications or programs stored in memory 20 or secondary storage 30, or received from the Internet or other network 40. Input device 34 may include any device for entering information into machine 10, such as a keyboard, mouse, cursor-control device, touch-screen, microphone, digital camera, video recorder, scanner, or camcorder. Display device 28 may include any type of device for presenting visual information such as, for example, a computer monitor or flat-screen display.

Examples of user machines for outputting data to output device 60 include personal computers, laptop computers, notebook computers, palm top computers, network computers, or any processor-controlled device capable of outputting data to output device 60. Although user machine 10 is depicted with various components, one skilled in the art will appreciate that these machines can contain additional or different components. In addition, although aspects of an implementation consistent with the present method are described as being stored in memory, one skilled in the art will appreciate that these methods can also be stored on or read from other types of computer program products or computer-readable media, such as secondary storage devices, including hard disks, floppy disks, or CD_ROM; a carrier wave from the Internet or other network; or other forms of RAM or ROM.

Figure 2A:
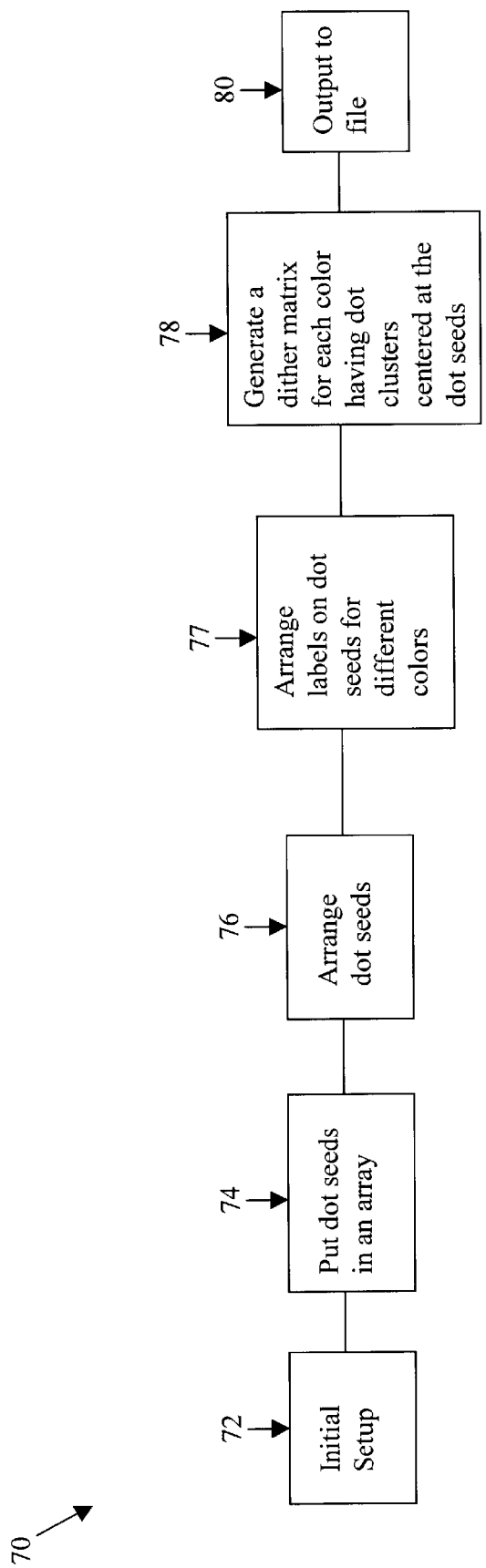
FIG. 2A is a block diagram of a preferred software embodiment of the method for dither matrix design for color halftoning using dispersed clustered dots.

FIG. 2A shows a preferred software embodiment 70 for a dither matrix design for color halftoning using dispersed clustered dots. Software embodiment 70 includes a module 72 for accepting input relating to an initial setup process, a module 74 for placing dot seeds in an array such that a dot seed is preferably never placed next to another dot seed, the characteristics of the array being determined by the initial setup, a module 76 for arranging the dot seeds placed in the array by module 74 into a homogeneous and isotropic pattern, a module 77 for arranging color labels on the dot seeds corresponding to the different colors to be printed, a module 78 for separating the labeled dot seeds into separate patterns, each of a particular color, and generating for each color a screen having dot clusters centered at the dot seeds for the color, and a module 80 for outputting a collection of the resulting screens to a file. Note that although the array examples discussed herein illustrate square screen arrays, those of ordinary skill in the art will appreciate, in light of these teachings, that this general methodology also applies for generating a set of screen arrays that are not square.

Figure 2B:
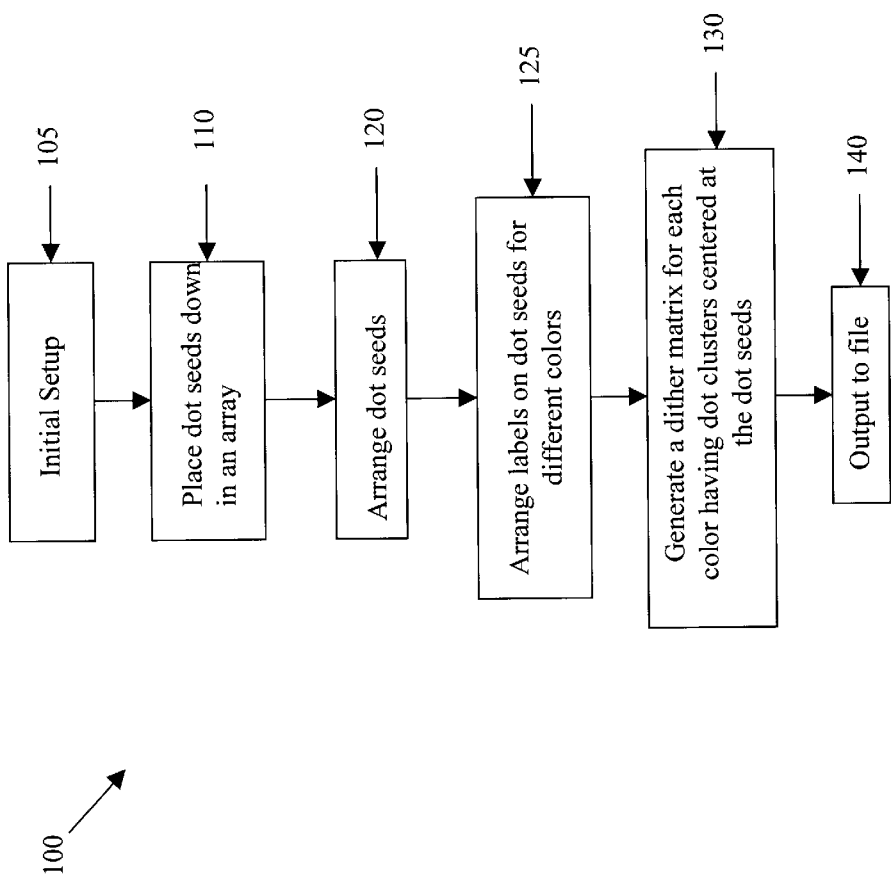
FIG. 2B is a flowchart of a preferred embodiment for dither matrix design for color halftoning using dispersed clustered dots.

FIG. 2B shows a flowchart of process 100 for a dither matrix design for color halftoning using dispersed clustered dots, which implements software embodiment 70. Process 100 includes subroutines for initial setup 105, placing dot seeds in an array 110 such that a dot seed is preferably never placed next to another dot seed, arranging dot seeds 120, arranging labels on the dot seeds corresponding to the different colors to be printed 125, separating the labeled dot seeds into separate patterns, each of a particular color, and generating for each color a screen having dot clusters centered at the dot seeds for the color 130, and outputting a collection of the resulting screens to a file 140. Memory 20 or secondary storage 30 may store instructions for carrying out process 100.

Figure 3:
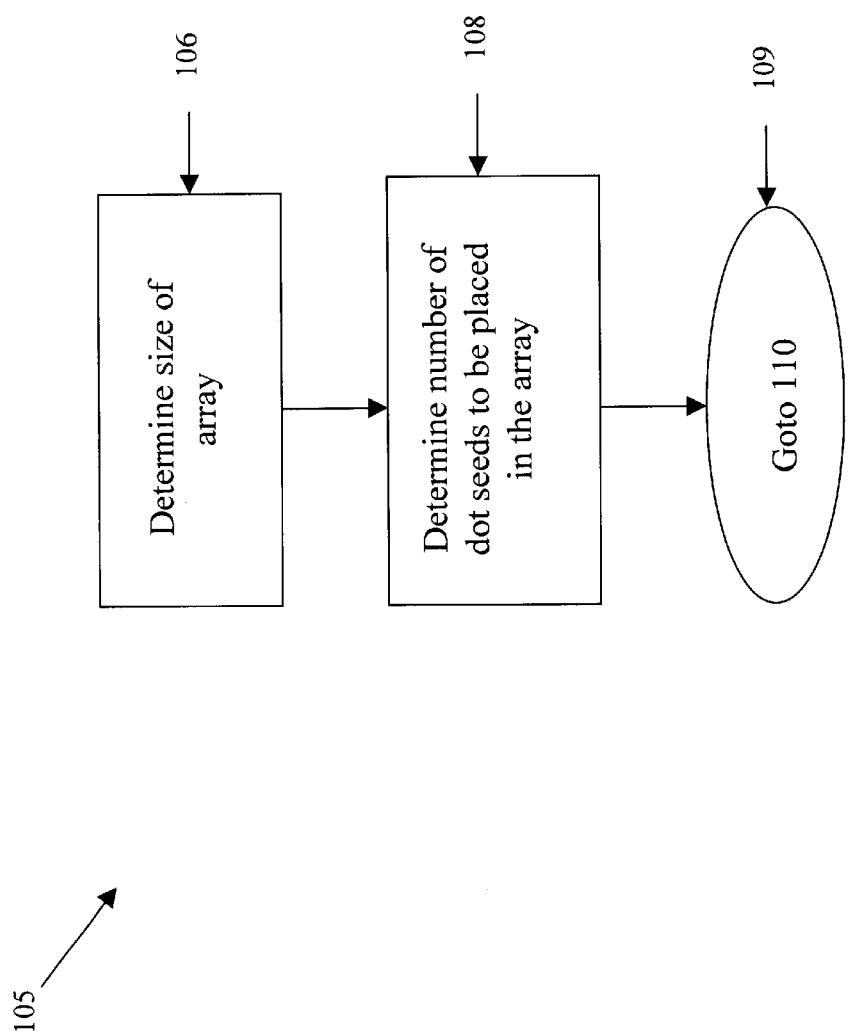
FIG. 3 is a flowchart of an initial setup subroutine.

During initial setup subroutine 105, as shown in FIG. 3, the screen designer, must determine both the size of the array to be used, step 106, as well as the number of dot seeds that will be placed in the array, step 108. A preferred criterion for the choice made in step 108 is the approximate dot size, which is analogous to the approximate average dot spacing in conventional clustered dot screen designs.

There are several considerations that must be taken into account when determining the size of the array, step 106. First, smaller screens require less computation to generate than larger screens. Where a screen is too large, it may take excessive computation to generate and will also require more memory to store, resulting in more expensive printers. On the other hand, very small screens, while less expensive, will increase the periodicity of the image, the periodicity being perceivable by humans and rendering the appearance of the image objectionable. The periodicity is the result of the repetition necessary to allow the smaller screen to print over the entire page. While the screen itself may be very random, when the screen must be repeated, periodicity will result. Therefore, larger screens are generally more preferable if resources allow to decrease the periodicity of the screen.

The number of dot seeds, which may also be referred to as dot cluster centers, that will be placed in the array is computed in step 108 as follows:

$$\text{num\_seeds} = K \times \left[ \frac{\text{screen\_side\_length} \times \text{approx\_dot\_cluster\_spacing}}{\text{print\_res}} \right]^2.$$

Here, screen_side_length is the side length of the screen or array. Print_res is the resolution of the printer, in dots per inch. This represents the closest that two printer dots can be and is a property of the printer. The term approx_dot_cluster_spacing refers to the desired level of spacing between the dots clusters. This is analogous to "lines per inch" in offset printing, where conventional clustered-dot screens are employed. Conventional clustered-dot screens, however, lead to dot clusters printed in a completely periodic fashion. Finally, the parameter K controls how tightly the dot clusters would be packed in with each other. As a rule of thumb, K should fall between 1 and 1.1547. This range is obtained by considering that K=1 corresponds to arranging the dots exactly on a square lattice. This is a bound on how loosely the dots should be packed in a halftone cell. K=1.1547 corresponds to arranging the dots on a hexagonal lattice. This is a bound on how tightly the dots could be packed in the halftone cell.

The designer must also consider the nature of the printing device itself. Since certain printers generate dots in a more stable fashion, these printers will not require the approximate average dot spacing that will be needed for a less stable printer. A printer that generates dots less stably may require a greater clustering of dots in order to insure that the image will be rendered clearly. Since larger dot clusters render less detailed images, an equilibrium must be struck between the desire for stable printer performance and the desire for images with finer detail. Therefore, the size of the screen and the number of dot seeds to be placed, and thus the approximate average dot spacing, must be balanced between these considerations. Once the initial setup, step 105, is completed, subroutine 105 then returns, step 109, to process 100.

Figure 4:
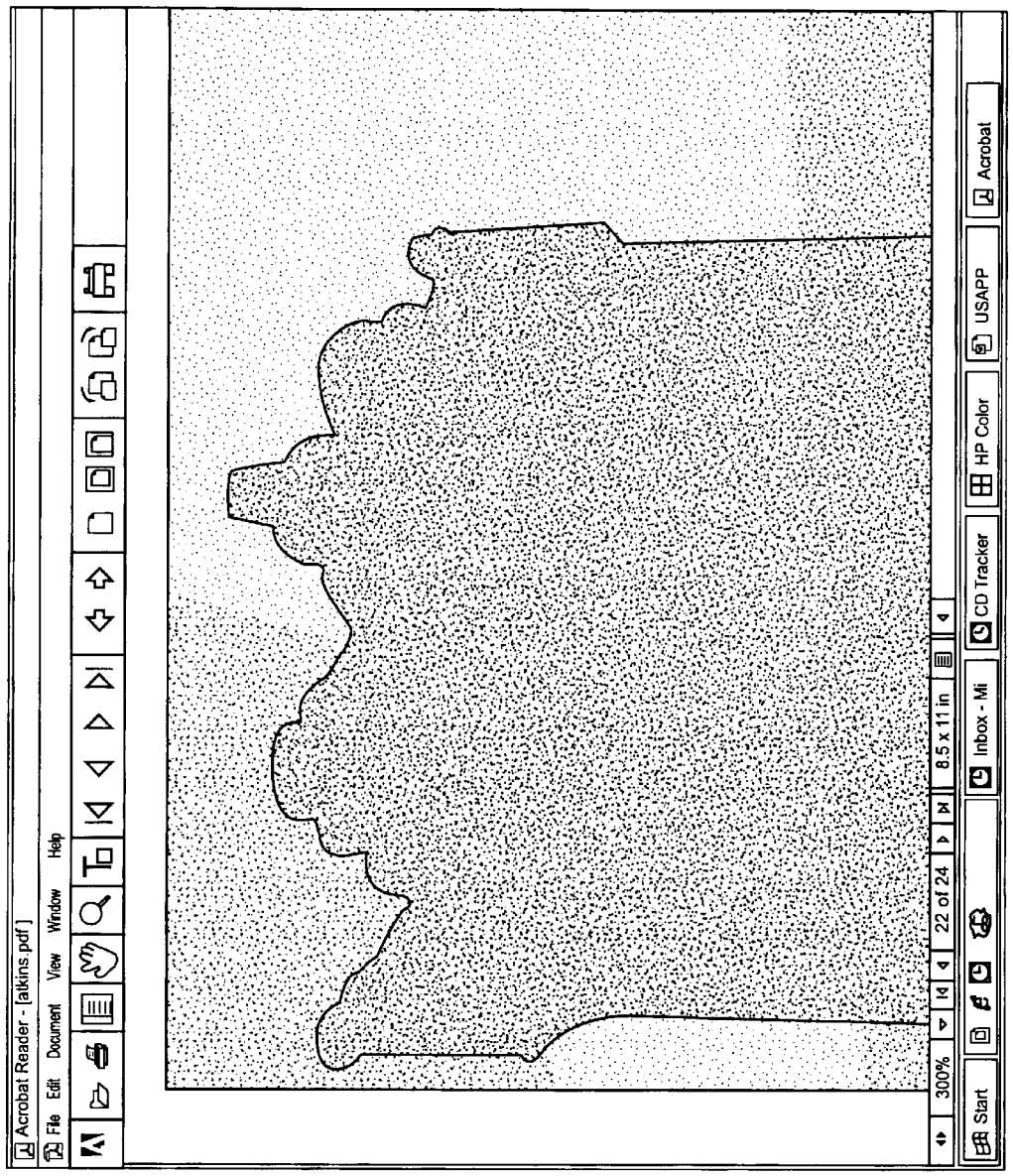
FIG. 4 is an illustration of dot seeds arranged in a homogeneous and isotropic pattern

Process 100 next places dot seeds into an array in subroutine 110. The dot seeds indicate starting locations from which the dot clusters themselves will be grown. A preferred method is to place the dot seeds randomly but in such a way that no two dot seeds are directly adjacent. Next, the dot seeds are arranged into a homogeneous and isotropic pattern in subroutine 120. FIG. 4, with particular attention to the light region at the upper right corner of the figure, is an illustration of dots in a roughly homogeneous and isotropic arrangement. A homogeneous arrangement means that the dots are evenly distributed, i.e. that the dots do not appear denser in one area than in another. An isotropic arrangement means the pattern of dots has substantially the same appearance when viewed from any angle, so that the dot distribution has a certain lack of regularity despite the homogeneity. This homogeneous and isotropic arrangement is preferred in order to avoid the moiré effects caused by sampling a previously sampled image.

Figure 5A:
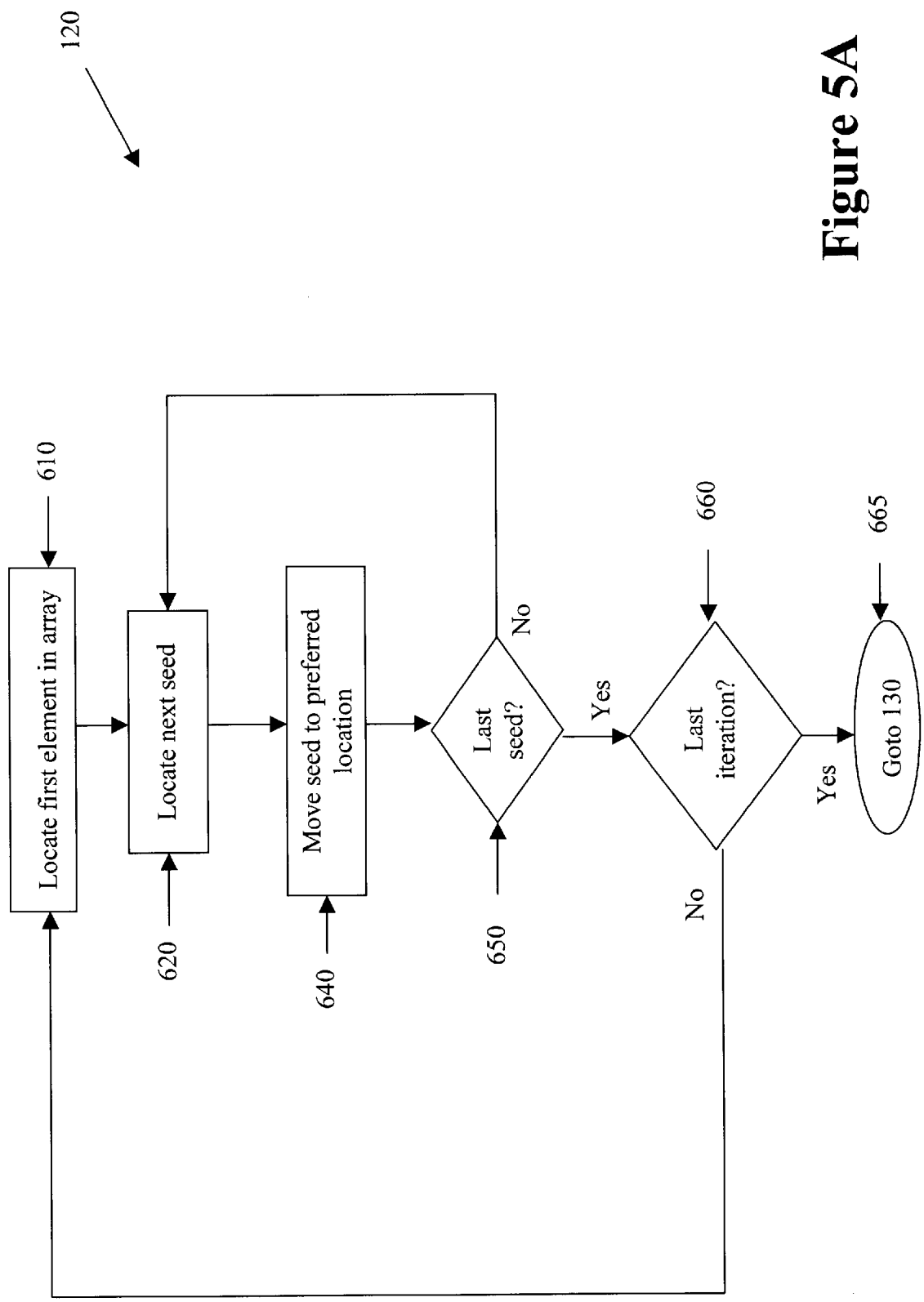
FIG. 5A is a flowchart of a subroutine for a sequential, iterative method of arranging the dot seeds.

FIG. 5A shows a flowchart for a preferred method for subroutine 120. Subroutine 120 is a method for arranging the dot seeds into a homogeneous and isotropic pattern. The dot seed rearrangement stage of subroutine 120 is iterative, the number of iterations being preselected. Each iteration consists of one raster-ordered pass through the array. Subroutine 120 begins with the first element in the array, step 610. Arrangement begins with the next seed in the lattice, step 620.

Next, in the turn of each dot seed location, the dot seed in that location is moved. Subroutine 120 moves the dot seed to a preferred location, step 640. The movement of a dot seed amounts to the minimization of a cost functional. This cost functional represents the energy stored in virtual springs that connect the dot seed under consideration to some neighboring seeds. To minimize this cost functional, the dot seed in question is allowed to move while the neighboring dot seeds remain fixed. Intuitively, this minimization has the effect of relaxing the dot seed distribution, resulting in a more homogeneous pattern. In practice, the cost functional is evaluated by assuming that the "rest length" of each of the springs is equal to the mean of the distances between the dot seed (at the dot seed's starting location) and its neighbors. This means that the ultimate arrangement of the dot seeds depends adapts to the initial dot seed distribution.

Figure 5B:
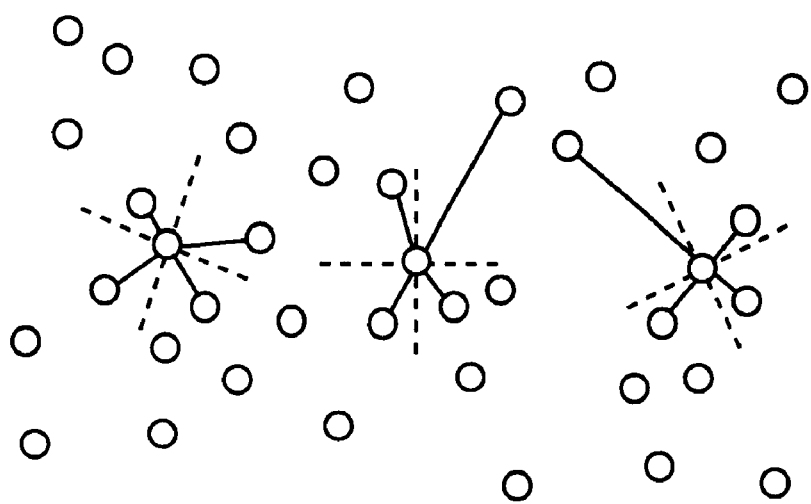
FIG. 5B is an illustration of neighboring dot seeds defined by sectors.

Neighboring dot seeds should be chosen so that the resulting dot seed distribution is homogeneous. For this, where there are N neighboring dot seeds, neighboring dot seeds should be chosen for each of N separate sectors subtending equal angles, as seen in FIG. 5B, for N=4. This has the effect of forcing dot seeds to mingle. Otherwise, isolated groups of at least N+1 dot seeds could permanently congregate in self-stable "cliques." To further encourage isotropic dot seed distributions, the boundaries of the sectors are oriented randomly for each dot seed, as seen in FIG. 5B.

Note that since neighboring dot seeds are in separate sectors, there may be other neighboring dot seeds that are close to the dot seed being moved, but which are not included in the cost functional. Practically, a potentially bad consequence of this would be that the dot seed could end up adjacent to another dot seed. To prevent this, the rule is enforced that the dot seed being moved is not allowed to move into any location that has another dot seed as a neighbor.

When screens are used, they are tiled to cover the whole image. Hence, screens are considered to have "toroidal boundaries." That is, the top border of the screen is viewed as being contiguous to the bottom border of the screen, and the right border is viewed as being contiguous to the left border. Thus, a dot seed located on the left edge of an array, for example, may have a neighbor at the right edge of the array.

An important parameter is the number N of neighboring dots which are chosen. In a preferred embodiment, N=4 is chosen to obtain a more homogeneous and isotropic dot distribution. However, N may be chosen up to N=8. Finally, although two iterations of step 620 to step 650 are generally sufficient for good results, more iterations will increase the smoothness and homogeneity of the dot seed distribution.

Dot seed movement 640, as seen in FIG. 5A, is implemented as a sequence of short traversals that terminate at a local minimum of the cost functional. In the (k+1)-th traversal, the dot seed is moved from a location, $n^{(k)}$, to an adjacent location, $n^{(k+1)}$, which decreases the cost functional the most. Any location which has no adjacent location that decreases the cost functional is a local minimum. The only restriction to this process is that the dot seed may not be moved into a location having another dot seed adjacent to it.

To evaluate the cost functional, the energy stored in the imaginary springs, which connect the dot seed to the dot seed's neighbors, is added up. If the dot seed is at location n, then the total energy e(n) is $$e(n) = \sum_{i=1}^{N} e_i(n),$$

where $e_i(n)$ is the energy in the spring connected to the i-th neighboring dot seed. This value, $e_i(n)$, is computed by squaring the magnitude of the imaginary spring's displacement, which is the difference between the rest length of the spring and the distance between the dot seed in question and the i-th neighboring dot seed. Specifically, $$e_i(n) = |d_i(n) - r|^2,$$

where $d_i(n)$ is the distance between dot seed location n and the location of the i-th neighboring dot $n_i$ and r is the rest length of the spring.

The rest length r is assumed to be the same for each of the springs connected to the dot seed being examined. The rest length is computed as the mean of the distances between the initial dot seed location and the locations of the N neighboring dot seeds; specifically, r is computed as $$r = (1/N) \sum_{i=1}^{N} \|n^{(0)} - n_i\|,$$

where $n^{(0)}$ is the initial dot seed location.

Subroutine 120 then determines whether the last dot seed in the sequence has been reached, step 650. If the previously arranged dot seed was not the last dot seed, subroutine 120 repeats the arrangement process with the next dot seed in the sequence, step 620. If the last dot seed has been reached, however, subroutine 120 determines whether the predetermined number of iterations has been performed, step 660. If the last iteration has not been performed, subroutine 120 returns to the beginning of the lattice to begin the process again, step 610. If the last iteration has been performed, subroutine 120 returns, step 665, 1to process 100.

Figure 6:
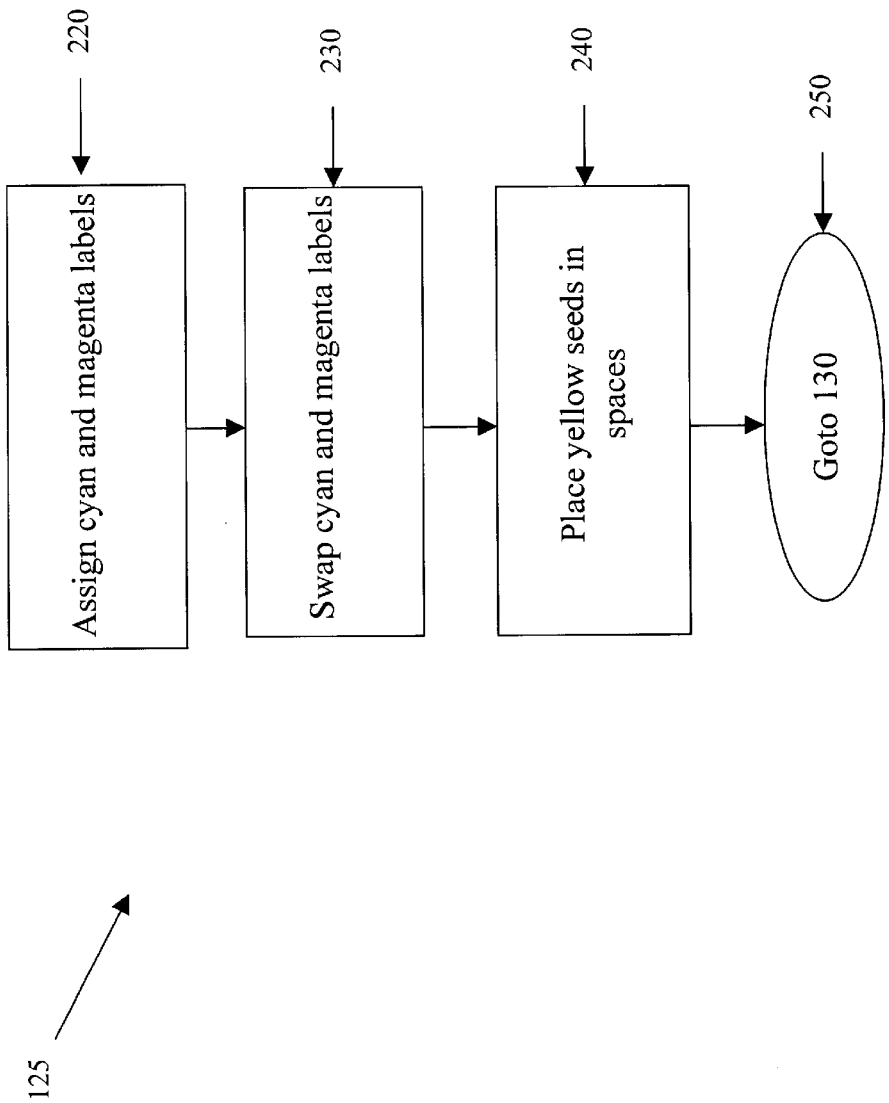
FIG. 6 is a flowchart of a subroutine for arranging color labels on the dot seeds, and inserting seeds for an additional color into spaces between seeds that are already arranged.
Figure 7:
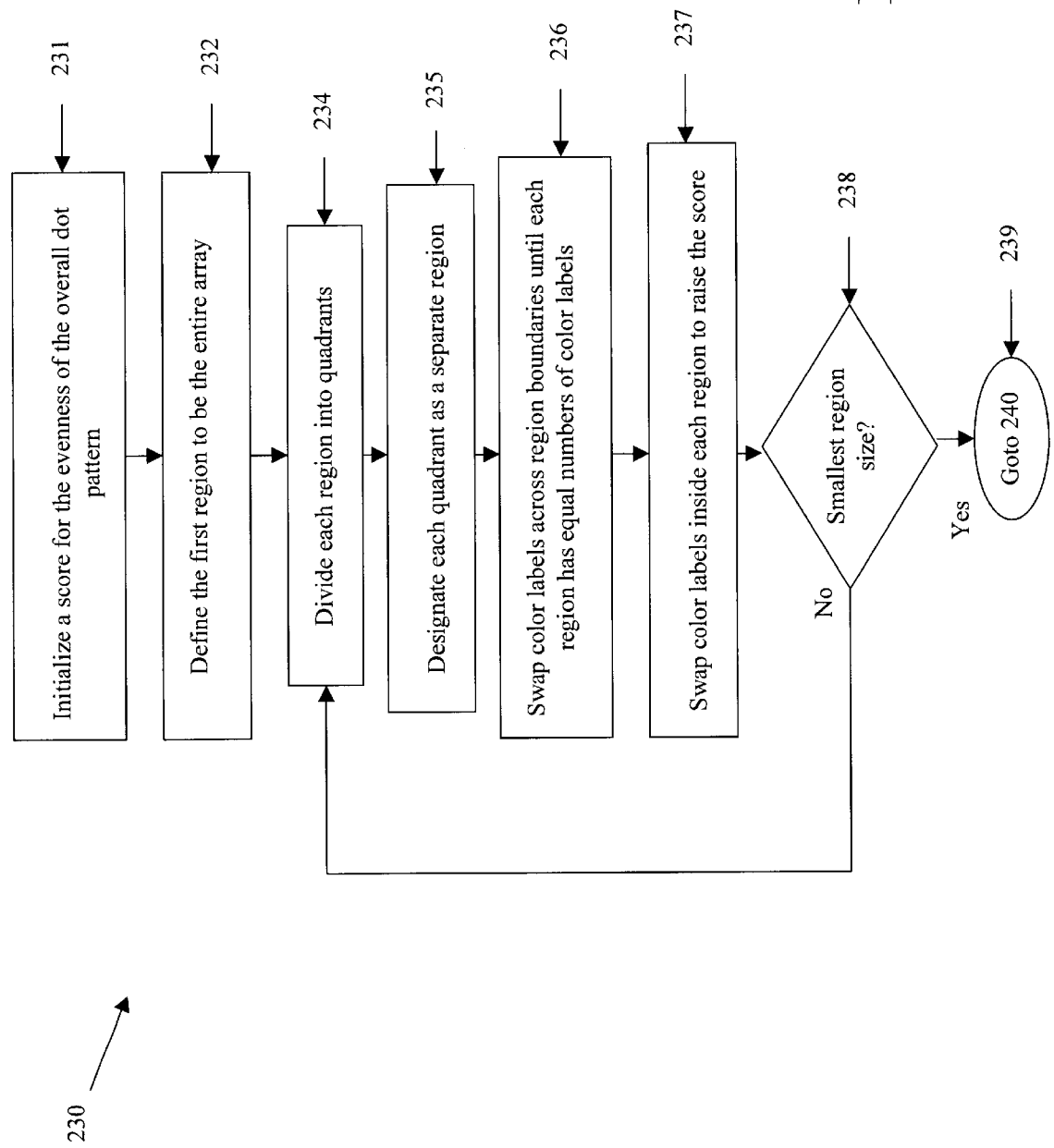
FIG. 7 is a flowchart of a preferred method for arranging cyan and magenta dot seeds.

Subroutine 125 of process 100 arranges color labels on the dot seeds, as shown in FIG. 6. The color labels correspond to the colors that will be printed in the final output. In a preferred embodiment, each dot seed is randomly assigned cyan labels and magenta labels, subroutine 220, such that half of the seeds are labeled cyan and half are labeled magenta. The cyan labels and magenta labels are then swapped, subroutine 230, so that dot seeds of each color are well dispersed relative to other dot seeds of the same color. An exemplary method of dispersing the color labels is shown in FIG. 7. The basic idea is to define a score for the dot pattern that corresponds to how well the color labels are distributed, and then to optimize the score. In an exemplary embodiment, the score for the dot pattern is defined by adding up scores for each individual dot seed in the array.

To compute the score for each individual dot seed, start with an initial value of zero and add an amount to the score for each neighboring dot seed within a radius of "influence". The magnitude of the amount depends on how close the neighboring dot seed is to the individual dot seed: the smaller the distance, the greater the magnitude of the amount. The sign, positive or negative, of the amount depends on whether the neighboring dot has the same color label or a different color label. If the neighboring dot has a different color label, the amount is positive; otherwise, the amount is negative. The objective is to maximize the score for the entire pattern.

As seen in FIG. 7, first, a score, which corresponds to the evenness of the overall dot pattern, is initialized, step 231. Next, the entire array is defined as a first region, step 232. The array, or first region, is divided into quadrants, step 234. Each quadrant becomes a new region. Color labels are swapped across region, or quadrant, boundaries until each new region has equal numbers of color labels, step 236. The color labels are then swapped within the new regions so as to raise the score, step 237. If the regions then existing are the smallest possible regions, as determined in step 238, subroutine 230 ends and returns to the process 100, step 239. Otherwise, the existing regions are again divided into quadrants, step 234, and the swapping process is repeated.

Finally, in subroutine 240, as seen in FIG. 6, any spaces that exist between the cyan seeds and magenta seeds are then filled with dot seeds labeled yellow such that there are an equal number of cyan, magenta, and yellow dot seeds. The idea behind filling the spaces between the cyan and magenta seeds with yellow seeds is that cyan and magenta colors should ideally overlap only in the darkest possible tones. Cyan and magenta mix to make blue, which is a darker color than either cyan or magenta taken alone. The result of adding yellow colorant in the spaces is that light blue and light composite black colors will be smoother and less grainy. Further, any rendering of one single primary colorant should have the desirable property of consisting of dot clusters distributed in a homogeneous, isotropic fashion.

In order to generate one screen per color, at this point in the process color planes corresponding to a particular dot seed color are pulled apart. For instance, to generate the cyan screen, all magenta and yellow dot seeds would be removed. Dot clusters are then grown around all of the remaining seeds, subroutine 130. This process is repeated for the other colorants, i.e. magenta, yellow, and black if desired. The result is three or four different screens—one for cyan, one for magenta, one for yellow, and one for black if necessary—that are output to a file, subroutine 140. The screens are overlaid for printing the final image. Although a color image may include a black screen component, color halftoning according to the present application would be more effective in cases where only cyan, magenta, and yellow color screens are present. This is because the black color, if present, will dominate the resulting image. The reason for this is that black colorant tends to be considerably darker than the cyan, magenta, and yellow colorants. To prevent this domination effect, the screen for the black component could be generated on its own using a process such as taught in the present application adapted for a single color plane.

Figure 8:
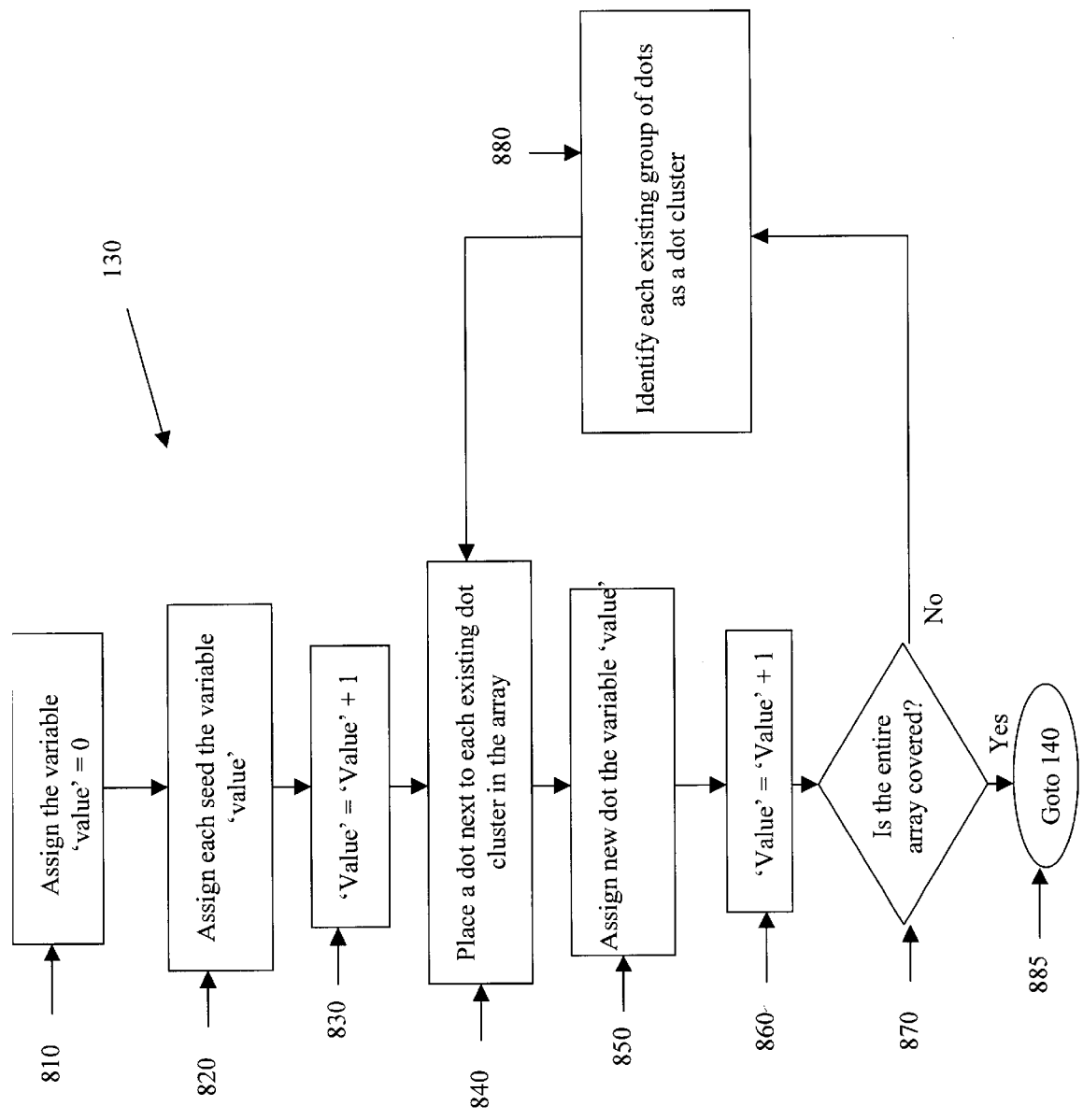
FIG. 8 is a flowchart of a subroutine for growing dot clusters around the dot seeds.

Subroutine 130 of process 100 grows the dot clusters around the dot seeds in each separate color screen. The method of subroutine 130 is shown by the flowchart of FIG. 8. Subroutine 130 is iterative. Each dot seed is given an initial value of zero, step 820. This can be facilitated by setting a variable 'value' equal to zero, step 810, and then assigning the variable 'value' to each dot seed, step 820. The variable is then incremented by one, step 830. Next a dot is placed next to each seed currently in the array in step 840. Each new dot is assigned the new variable value, step 850. The variable is again incremented, step 860. This process continues until the entire array has been covered. If, at any particular iteration the entire array has not been covered, as determined in step 870, each original dot seed and any dots that have been placed around that dot seed thus far are identified as a single dot cluster, step 880. Then a new dot is placed next to all existing dot clusters, step 840, if space allows.

At each stage, the new dot is added to a location adjacent to the existing dot cluster in a spiraling fashion. As a result, each dot cluster grows outward. This ensures that the dot clusters all grow in size at the same rate as the stages progress. To prevent the dot clusters from overlapping as they are grown, higher stage dots may be added only to array elements that have not yet been filled in. Once the entire array has been covered, subroutine 130 returns, step 885, to process 100. Finally, subroutine 140 outputs the collection of screens corresponding to each different color to a file from which the actual printing will take place.

Figures 9, 10A, 10B:
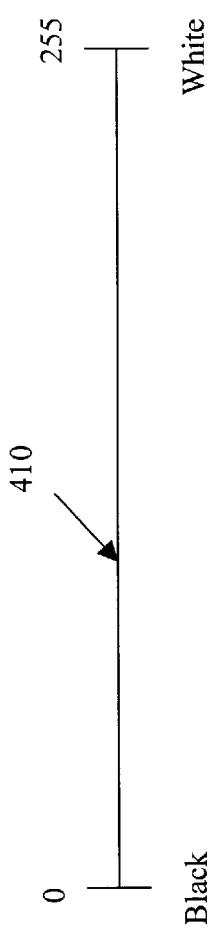
FIG. 9 is a diagram of the pixel value scale.
FIG. 10A is a diagram of a non-normalized 3×3 array.
FIG. 10B is a diagram of a normalized 3×3 array.

FIG. 10A shows an example of a 3×3 array. For halftoning in general, each location in array 420 is assigned a value, from zero to the total number of locations in array 420 minus one. Array 420 can be considered as being tiled over on top of the image in a non-overlapping fashion. At every pixel, there corresponds one of the values in array 420. Every pixel has a value as well, corresponding to the lightness or darkness of the pixel. The tone quality of the pixel is quantified on a pixel scale 410 ranging, usually, from 0 to 255, as shown in FIG. 9, although other pixel valuations are possible. Here, we assume without loss of generality, that if the pixel is darker, the pixel's value is closer to 0 and that if the pixel is lighter, the pixel's value is closer to 255.

Array 420 is usually represented as normalized array 430, as seen in FIG. 10B. In normalized array 430, the array values, called threshold values, fall in the range of pixel values 410. This normalization can be done in several ways. In an exemplary method, where the pixel values range from 0 to 255, the individual array values are divided by the total number of array locations minus one. The result is then multiplied by the maximum array value, in this case 255. The formula is as follows:

$$[\text{Array Value}/(N-1)] \times 255$$

where N is the total number of array locations.

Figures 11A, 11B, 11C:
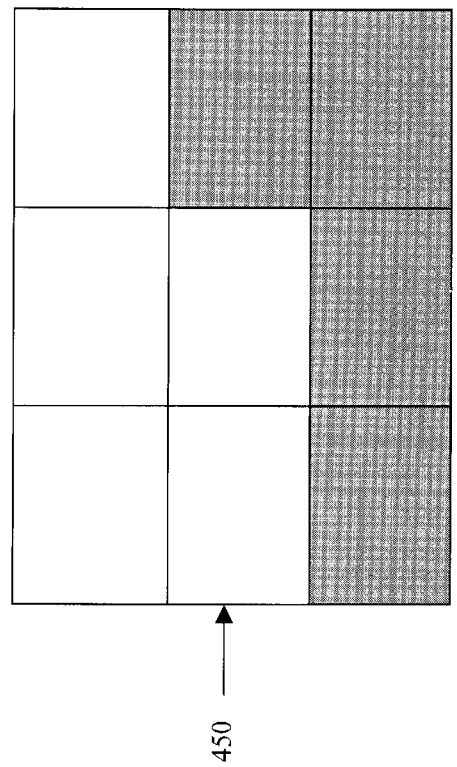
FIG. 11A is a diagram of pixel values associated with array locations.
FIG. 11B is a diagram of a corresponding normalized 3×3 array.
FIG. 11C is a diagram of a resulting output halftone image.

An output halftone image is generated through a simple comparison procedure. The pixel values corresponding to the array locations 440, as seen in FIG. 11A, are compared to the normalized threshold values of the screen array 430, as shown in FIG. 11B. If the pixel value at a particular location 440 is less than or equal to the normalized threshold array value at that location 430, a dot is printed. If the pixel value at a particular location 440 is greater than the normalized threshold array value at that location 430, a dot is not printed. The resulting output halftone image 450 is shown in FIG. 11C, as corresponds to the pixel values 440 and the normalized array 430 as shown in FIGS. 11A and 11B.

Finally, whereas the arrays shown in FIGS. 10A, 10B, and 11B are M×M square arrays arranged in a raster order, clustered dot screens 500 are often arranged in a spiral, as seen in FIG. 12. These arrays are arranged so that, if you count down from the maximum number of the array—for example in FIG. 12, the maximum number is 24, which corresponds to a 5×5 square array—the array locations proceed outward in a spiral. This configuration corresponds intuitively to the way these dot clusters are grown for darker and darker gray levels.

Having described preferred embodiments of a novel method for color halftoning using dispersed dot clusters (which are intended to be illustrative and not limiting), note that modifications and variations can be made by persons skilled in the art in light of the above teachings. Therefore, understand that changes may be made in the particular embodiments disclosed which are within the scope and spirit of what is described as defined by the appended claims.

Having thus described a novel method for a dither matrix design for color halftoning using dispersed dot clusters with the details and particularity required by the patent laws, what is claimed and desired protected by Letters Patent is set forth in the appended claims.

What is claimed is:

1. A method for a dither matrix design for color halftoning, comprising the steps of:
    placing dot seeds in an array;
    arranging the dot seeds, wherein the resulting pattern is homogeneous and isotropic;
    arranging at least one color label on the dot seeds such that each dot seed labeled with a particular color is well dispersed from other dot seeds labeled with the same color, wherein the at least one color label corresponds to the colors to be printed;

growing dots clusters around the dot seeds; and outputting to a screen file one dither matrix for each color.

2. The method of claim 1, further comprising the step of placing additional dot seeds labeled with an additional color into spaces between the dot seeds that have been arranged with the at least one color label.

3. The method of claim 1 or 2, wherein the at least one color label represents three colors.

4. The method of claim 3, wherein the three colors are cyan, magenta, and yellow.

5. The method of claim 1 or 2, wherein the at least one color label represents two colors.

6. The method of claim 5, wherein the two colors are cyan and magenta.

7. The method of claim 2, wherein the additional color is yellow.

8. The method of claim 1, further comprising the step of determining the size of the array and determining the number of dot seeds that will be in the array.

9. The method of claim 1, wherein the dot clusters are grown using a spiral pattern.

10. The method of claim 1, wherein:

dot seeds labeled with a particular color are separated from differently labeled dot seeds and placed in an array with like colored dot seeds;

dot clusters are grown around the dot seeds in each array separately; and a collection of the dither matrices for each color are output to a file.

11. A computer program product for dither matrix design for color halftoning, comprising:

a placement subroutine, wherein dot seeds are placed in an array;

a first arrangement subroutine, wherein the dot seeds placed by the placement subroutine are arranged in a homogeneous and isotropic pattern;

a second arrangement subroutine, wherein at least one label corresponding to the colors to be printed is arranged on the dot seeds such that each dot seed labeled with a particular color is well dispersed from other dot seeds labeled with the same color;

a growing subroutine, wherein dot clusters are grown around the dot seeds; and an output subroutine, wherein one dither matrix for each color is output to a screen file.

12. The computer program product of claim 11, further comprising an additional placement subroutine, wherein dot seeds labeled with an additional color are placed into spaces between the dot seeds that have been arranged with the at least one color label.

13. The computer program product of claim 11 or 12, wherein the at least one color label represents three colors.

14. The computer program product of claim 13, wherein the three colors are cyan, magenta, and yellow.

15. The computer program product of claim 11 or 12, wherein the at least one color label represents two colors.

16. The computer program product of claim 15, wherein the two colors are cyan and magenta.

17. The computer program product of claim 12, wherein the additional color is yellow.

18. The computer program product of claim 11, wherein the dot clusters are grown using a spiral pattern.

19. The computer program product of claim 11, wherein:

dot seeds labeled with a particular color are separated from differently labeled dot seeds and placed in a screen with like colored dot seeds;

dot clusters are grown around the dot seeds in each screen separately; and a collection of the dither matrices for each color are output to a file.

20. A computer program product for dither matrix design for color halftoning, comprising:

means for putting dot seeds in an array;

means for arranging the dot seeds, wherein the resulting pattern in homogeneous and isotropic;

means for arranging at least one color label on the dot seeds such that each dot seed labeled with a particular color is well dispersed from other dot seeds labeled with the same color, whereby the at least one color label corresponds to the colors to be printed;

means for growing dot clusters around the dot seeds; and means for outputting to a screen file one dither matrix for each color.

21. The computer program product of claim 20, further comprising means for putting additional dot seeds labeled with an additional color into spaces between the dot seeds that have been arranged with color labels.

22. A computer-readable medium containing instructions for dither matrix design for color halftoning, comprising:

a placement subroutine, wherein dot seeds are placed in an array;

a first arrangement subroutine, wherein the dot seeds are arranged in a homogeneous and isotropic pattern;

a second arrangement subroutine, wherein at least one label corresponding to the colors to be printed is arranged on the dot seeds such that each dot seed labeled with a particular color is well dispersed from other dot seeds labeled with the same color;

a growing subroutine, wherein dot clusters are grown around the dot seeds; and an output subroutine, wherein one dither matrix for each color is output to a screen file.

23. The computer-readable medium of claim 22, further comprising an additional placement subroutine, wherein dot seeds labeled with an additional color are placed into spaces between the dot seeds that have been arranged with color labels.

24. A machine for implementing instructions for dither matrix design for color halftoning, comprising:

a memory containing the instructions, wherein the instructions comprise:

a subroutine that places dot seeds in an array;

a subroutine that arranges the dot seeds, wherein the resulting pattern in homogeneous and isotropic;

a subroutine that arranges at least one color label on the dot seeds such that each dot seed labeled with a particular color is well dispersed from other dot seeds labeled with the same color, whereby the at least one color label corresponds to the colors to be printed;

a subroutine that grows dot clusters around the dot seeds; and a subroutine that outputs one dither matrix for each color to a screen file;

a processor in communication with the memory, wherein the processor accesses the memory and implements the instructions contained in the memory; and an output device in communication with the processor, wherein the output device displays an output resulting from execution of the instructions contained in the memory.

* * * * *